(12) United States Patent  
Mellman et al.

(10) Patent No.: US 8,775,291 B1
(45) Date of Patent: Jul. 8, 2014

(54) SYSTEMS AND METHODS FOR ENRICHMENT OF DATA RELATING TO CONSUMER CREDIT COLLATERALIZED DEBT AND REAL PROPERTY AND UTILIZATION OF SAME TO MAXIMIZE RISK PREDICTION

(75) Inventors: Joseph Mellman, Chicago, IL (US); Dina Anderson, Chicago, IL (US); Cliff Burns, Geneva, IL (US); Paul Fritz, Geneva, IL (US); Antoni Guitart, Chicago, IL (US); Joan Murphy, Lombard, IL (US)

(73) Assignee: Trans Union LLC, Chicago, IL (US)

( * ) Notice: Subject to any disclaimer, the term of this patent is extended or adjusted under 35 U.S.C. 154(b) by 51 days.

(21) Appl. No.: 12/415,959

(22) Filed: Mar. 31, 2009

Related U.S. Application Data

(60) Provisional application No. 61/041,049, filed on Mar. 31, 2008.

(51) Int. Cl.
*G06Q 40/00* (2012.01)

(52) U.S. Cl.
USPC ....................................................... 705/36 R

(58) Field of Classification Search
USPC ............................................... 705/36 R
See application file for complete search history.

(56) References Cited

U.S. PATENT DOCUMENTS

| | | | |
|---|---|---|---|
| 6,533,724 B2 | 3/2003 | McNair | |
| 6,556,979 B1* | 4/2003 | Liu et al. | 706/20 |
| 7,321,881 B2 | 1/2008 | Saidi et al. | |
| 7,610,229 B1* | 10/2009 | Kornegay et al. | 705/38 |
| 7,689,506 B2* | 3/2010 | Fei et al. | 705/39 |
| 7,970,934 B1* | 6/2011 | Patel | 709/244 |
| 2003/0018549 A1* | 1/2003 | Fei et al. | 705/30 |
| 2003/0083984 A1* | 5/2003 | Crawford et al. | 705/38 |
| 2003/0236765 A1* | 12/2003 | Pulst et al. | 707/1 |
| 2007/0022027 A1* | 1/2007 | Gupta et al. | 705/35 |
| 2007/0055619 A1* | 3/2007 | Abrahams et al. | 705/38 |
| 2007/0192242 A1* | 8/2007 | Kunz | 705/38 |
| 2007/0192243 A1* | 8/2007 | Garbarino et al. | 705/39 |
| 2007/0198401 A1* | 8/2007 | Kunz | 705/38 |
| 2008/0009684 A1 | 1/2008 | Corsetti et al. | |
| 2008/0243680 A1* | 10/2008 | Megdal et al. | 705/38 |

OTHER PUBLICATIONS

Heuristic judgment theory Harvey, John T. Journal of Economic Issues 32.1 (Mar 1998): 47-64.*
Women's Experience of Power: A Theory for Educational Development Mayo-Chamberlain, Jane. The Ohio State University, ProQuest, UMI Dissertations Publishing, 1980. 8107366.*
The Effect of Hierarchical Reduction and Relapse Training on Abstinence From Smoking. (vol. I and II) (Stimulus Control) PIPP, Frances Dorris. Wayne State University, ProQuest, UMI Dissertations Publishing, 1985. 8514154.).*

* cited by examiner

*Primary Examiner* — Hani M Kazimi
*Assistant Examiner* — Hatem M Ali
(74) *Attorney, Agent, or Firm* — William J. Lenz; Neal, Gerber & Eisenberg LLP

(57) ABSTRACT

Systems and methods for enrichment of data associated with risk prediction. Data may be enriched by incorporating one or more aspects of consumer credit, collateralized debt, mortgage, real property, and loan data for use in systems, products, and methods relying on risk prediction models to maximize the effectiveness of the risk prediction. A time-series of consumer credit data may be provided to provide historical context to data. In a particular application, enriched data is leveraged to predict occurrence of an event relating to underlying assets of a structured security, such as a mortgage-backed security. Other systems and methods are disclosed.

9 Claims, 11 Drawing Sheets

SYSTEMS AND METHODS FOR ENRICHMENT OF DATA RELATING TO CONSUMER CREDIT COLLATERALIZED DEBT AND REAL PROPERTY AND UTILIZATION OF SAME TO MAXIMIZE RISK PREDICTION

RELATED APPLICATIONS

This application claims priority to U.S. Provisional Patent Application No. 61/041,049, filed Mar. 31, 2008.

TECHNICAL FIELD

The disclosure herein relates to systems and methods associated with enrichment of data utilized in risk prediction, and more particularly to enrichment of data by incorporating consumer credit, collateralized debt, mortgage, real property, and loan data for use in systems, products, and methods relying on risk prediction models to maximize the effectiveness of the risk prediction.

BACKGROUND OF THE INVENTION

Many products and methods utilized in the financial and consumer lending industry rely on some underlying model of risk prediction. Risk prediction models are typically used in the underlying analysis of a decision to grant credit to a consumer or institution, and such models are typically embodied in a credit score or other metric. In the area of structured securities, risk models may be used for pricing the securities. Current risk models, however, have many shortcomings. For example, current pricing models for structured securities, such as mortgage-backed securities, collateralized debt obligations, etc., are typically based on sub-optimal and aged static measures of retail credit risk. Existing risk models for structured securities have many shortcomings at the product level, credit tier level, and the portfolio level. For example, existing generic risk models provide a flat prediction of probability of an event, such as probability of default (PD), over a fixed time window and generally do not get updated after the loan's origination. Furthermore, these risk models do not capture critical aspects of default risk for mortgages, such as loan type, annual percentage rate (APR), loan-to-value percentages (LTV), and other specific loan-level data. In the present securities industry, when individual cash streams (which are often sourced from consumer debt) are aggregated into a security, the consumer identifying information for each cash stream is typically lost. For example, for mortgage-backed securities, the borrower identification for each specific loan in the security is not available.

Therefore, there is a need for, among other things, systems and methods for creating enriched data and applying the enriched data to improve risk prediction across numerous financial and lending products and applications, including, but not limited to, mortgage-backed securities and consumer credit analysis. In the securities area, these is a need for, among other things, improved PD estimates of underlying assets and more pertinent discounting factors for the cash flows of the assets, which would lead to more precise valuations of the securities and the creation of trading opportunities. For many financial products and applications, there is a need for, among other things, more dynamic credit-related data. The present invention addresses these and other needs, as will become apparent from the following detailed description and accompanying drawings.

SUMMARY OF THE INVENTION

Systems and methods for facilitating enrichment of data utilized in risk prediction are provided. According to a particular aspect, data may be enriched by incorporating one or more aspects of consumer credit, collateralized debt, mortgage, real property, and loan data for use in systems, products, and methods relying on risk prediction models to maximize the effectiveness of the risk prediction.

According to another aspect, a system and related method provides for a time-series of consumer credit data to provide historical context to data. Rather than provide a static snapshot of credit data for a specific consumer at a given point in time, the time-series data provides a series of data over a predetermined period of time at a predetermined time interval or at any specified points in time. The time-series data provides a dynamic range of data that incorporates trending and other patterns not incorporated in static data.

According to yet another aspect, systems and methods are provided to match underlying assets of a security to consumer data, such as credit data, to allow enrichment of the data relating to the underlying assets to, among other things, allow more robust risk prediction and more accurate valuation and pricing.

According to yet another aspect, systems and methods are provided for predicting occurrence of an event relating to underlying assets of a structured security, such as a mortgage-backed security, by leveraging up-to-date data relating to the underlying assets, such as consumer credit information, current property valuation estimates, macro-economic indicators and forecasts, aggregate credit attribute forecasts, payment history, and many other types of data in a time-dependent survival analysis statistical model. The model provides a vector of probability, such a vector of credit default probabilities in the case of a mortgage-related security, which can be utilized in pricing/valuation of the structured security.

According to yet another aspect, credit data utilized in the aforementioned model process is refreshed regularly to give a more dynamic picture of the security, as opposed to aged static measures that are not refreshed.

According to another aspect, as related to the aforementioned model process and as applied to mortgage-related securities, individual credit data is matched to individual loans of the security using one or more attributes, thereby allowing use of specific individual credit data in the model process.

According to yet another aspect, trend data, geographic data, and macroeconomic data are utilized in the aforementioned model process to determine a more accurate and timely risk predictor as compared to prior predictors.

These and other aspects of the present invention will become apparent and be more fully understood from the following detailed description and accompanying drawings, which set forth illustrative embodiments that are indicative of some of the various ways in which the principles contemplated herein may be employed.

DETAILED DESCRIPTION OF EXEMPLARY EMBODIMENTS

Figure 1:
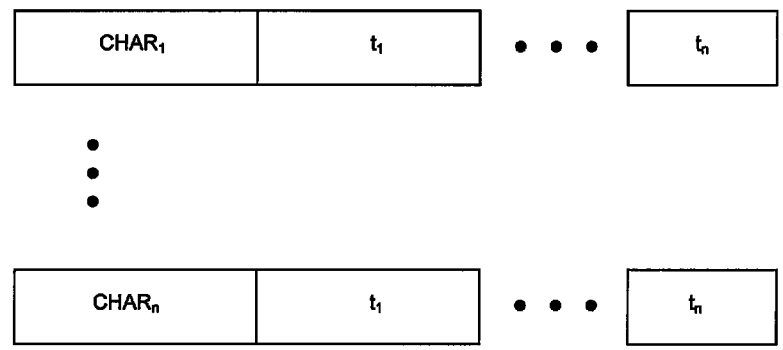
FIG. 1 is a diagram illustrating an exemplary data structure for a time series set of consumer credit data in accordance with one or more principles contemplated herein.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood to one of ordinary skill in the art.

Time-Series Portfolio Information

According to a particular aspect, a system and related method provides for a time-series of consumer credit data to provide historical context to data. In a particular embodiment, the time-series of data may be used in analysis associated with loans in a whole loan portfolio. Rather than provide a static snapshot of credit data for a specific consumer at a given point in time, the time-series data provides a series of data over a predetermined period of time at a predetermined time interval or at any specified points in time. The time-series data provides a dynamic range of data that incorporates trending and other patterns not incorporated in static data. For example, a time series of a consumer's credit score may be generated and utilized in risk prediction models to increase success of risk prediction. In such an example, the time-series of data may include a consumer's credit score within a 6-month range, given in 1-month increments. The time-series of data would thus indicate any trending or pattern over the 6-month range. Trending identification is particularly useful when comparing credit data of consumers that, according to static credit score measures, have similar credit scores. The time-series data may identify that one or more of these consumers have been trending downward or upward within this predetermined range of time. Downward trending in this example could contribute to increased risk associated with a particular consumer and any associated product incorporating that consumer's debt or loan.

According to a particular aspect, a data structure for consumer credit file data is provided to accommodate a time-series set of data for one or more data types in a credit file. In a particular embodiment, the data structure is three-dimensional; allowing storage of time-series sets of data associated with each time-dependent credit data characteristic for each individual credit file. An exemplary data structure is illustrated in FIG. 1. The data structure may include, for example, a plurality of data values for one or more particular variables (sometimes referred to as characteristics) representing data values over a predetermined period of time and at predetermined intervals or points in time. In a particular embodiment, a data structure is provided to accommodate a time-series set of data for each characteristic or variable in a typical consumer credit file. In yet another embodiment, an index or score is generated for each time-series set of data, which represents a characteristic associated with the time-series set of data. The index or score, for example, may represent risk associated with a trend in the time-series set of data. In a particular embodiment, one or more such indexes or scores may be utilized in the calculation of an overall credit score. The data structure of the credit file creates a matrix of time-dependent variables within a given set of time and sample constraints. Such data structure may be applied to computer-implemented algorithms providing analysis of the time-series data, such as in risk prediction analysis and development of statistical models.

The generation and use of time-series data must be compliant with the Fair Credit Reporting Act (FCRA), 15 U.S.C. §1681 et seq., and other applicable laws and regulations governing credit data and other personal data. The FCRA dictates that credit bureaus may only provide historical consumer credit information in an anonymous fashion if the information is not also disclosed to the consumer. According to another aspect, an FCRA compliant system and method for retrieval and delivery of time-series data is provided. To facilitate disclosure of time-series data in an anonymous fashion, a unique key or identifier is assigned to replace the identification information for each particular consumer for each one or more time-series sets of data that have been provided to a third-party entity. If, as part of its analysis of the data, the third-party entity wants to know the identity of a subset of the data records delivered in an anonymous fashion, it can provide the unique identifier(s) back to the credit bureau. The credit bureau can then utilize these identifiers and return to the third-party identifying information for each of the records of the subset, but in a randomized order so as to prevent the third-party from being able to match the identifications to the specific time-series data sets originally provided. The individual identifying information may include, for example, name, address, and current credit information. By providing this information, the third-party entity may conduct additional analysis of data that requires such identification information.

According to another aspect, a computer system is configured to generate a set of credit data, a credit file, or a credit report incorporating one or more time-series sets of data each corresponding to a particular characteristic in a credit file. In a particular embodiment, the set of credit data, the credit file, or the credit report includes the aforementioned unique identifier. In a particular embodiment, the computer system includes a memory having software stored thereon, wherein the software includes computer executable instructions for extracting credit data from one or more databases, wherein the credit data includes a time-series set of data for at least one credit file characteristic, accessing a data structure having data fields configured for a time-series data set for at least one time-dependent credit file characteristic, populating the data structure with at least one time-series set of data, and outputting in a credit report the data having at least one time-series data set for at least one credit file characteristic.

Matching Underlying Assets of Security to Credit Data

According to a particular aspect, systems and methods are provided to match underlying assets of a security to consumer data, such as credit data, to allow enrichment of the data relating to the underlying assets to, among other things, allow more robust risk prediction and more accurate valuation and pricing.

Figure 2:
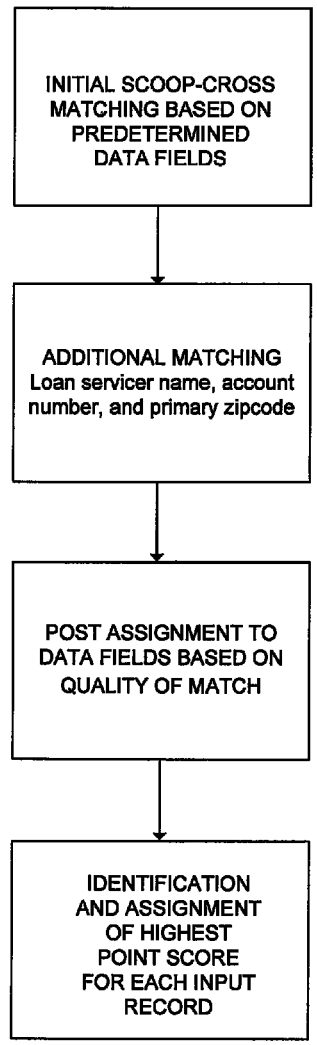
FIG. 2 is a flow diagram illustrating a matching algorithm for matching mortgage data to credit consumers.

In an exemplary embodiment, a matching algorithm is provided for matching mortgage data to credit consumers. The matching algorithm starts with an initial set of data associated with the security and underlying asset data without identification data, or having substantially incomplete data, for the consumer associated with each of the underlying assets. In this particular embodiment, the algorithm incorporates a general four step process, with the understanding that other steps may be added to enhance the process and existing steps may be omitted or augmented to achieve substantially the same result. Referring to FIG. 2, an initial scoop is performed at step 22. At this step, for each input record from the initial set of security/asset data, consumer subjects from one or more credit bureau databases are identified by cross-matching certain data fields within each group of data. In a particular embodiment, the data fields of zip code, high credit amount, and account open date in the credit bureau database are respectively cross-matched with zip code, origination amount, and origination date for each input record of the initial set of data. This cross-matching results in an initial scoop of consumer credit files.

At step 24, an additional matching is performed for loan servicer name, account number and primary zip code. At step 26, points are assigned to each data field based on the quality of the match. In a particular embodiment, each field carries a different point value and weight based on overall effectiveness in successful matching. At step 28, for each input record, the credit consumer with the highest point score is identified and returned. If a tie score occurs, the record with the most recent account activity is identified and returned.

As a result of the matching process, various additional data outside the scope of the initial set of data associated with the security and underlying asset data can be obtained to enrich the initial set of data. For example, various consumer credit file data may be accessed for each individual loan within the security to allow additional analysis for risk prediction associated with each loan. In securities markets, for example, such additional data may be utilized to analyze and determine probability of default and prepayment for each of the cash-flow streams represented by the underlying debt. Such analysis may be used, alone or in combination with other aspects herein, for example, to more accurately price the securities, as will be described in more detail below.

Prediction of Occurrence of Event Relating to Underlying Assets of a Structured Security In an exemplary embodiment applying one or more principles described and contemplated herein, prediction of an occurrence of an event relating to underlying assets of a structured security is provided. According to a particular aspect, systems and methods for such prediction preferably incorporate time dependent risk prediction associated with underlying assets, which may include analysis of loan-level credit data, macro-economic data, and risk models at the underlying asset level for use in risk prediction and associated pricing of structured securities.

The systems and methods are generally directed to improving prediction of occurrence of an event relating to underlying assets of a structured security, such as a mortgage-backed security, by leveraging up-to-date data relating to the underlying assets, such as consumer credit information, current property valuation estimates, macro indicators and forecasts, payment history, and many other types of data as will be described herein, and periodically updating such leveraging with refreshed data to maintain the timeliness and accuracy of the prediction in a "dynamic" fashion. According to a particular aspect, the systems and methods generate a vector of probability over time, such as credit default probabilities over time, as a risk indicator. However, other metrics relating to the assets can be generated, such as, for example, in the case of a loan, probability of prepayment or probability of delinquency, and in the case of a mortgage, probability of foreclosure. According to a particular aspect, a set of data associated with the underlying assets of a particular security can be processed in a model to determine the probability of the event, such as PD, and that probability can then be incorporated into pricing models or other valuation of the security. Such processing can be performed at predetermined or arbitrary intervals to maintain the timeliness and accuracy of the probability.

Figure 3:
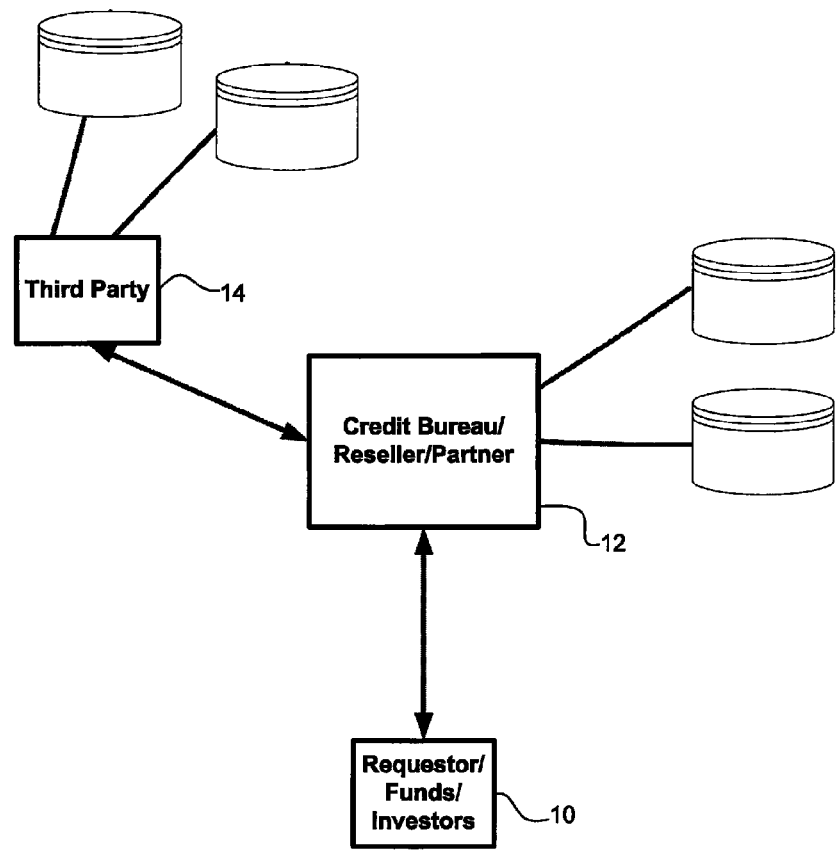
FIG. 3 is a schematic diagram illustrating a general embodiment of a system for carrying out methods in accordance with one or more principles contemplated herein.

FIG. 3 is a schematic diagram illustrating a general process in accordance with the principles of the present invention. In FIG. 3, a fund/investor 10 makes a request for prediction modeling of one or more securities to a credit bureau 12 or associated reseller or partner. In addition to a specific request, the prediction modeling can also be processed as part of other services as well. In a preferred embodiment, the prediction modeling is performed in a batch process. The credit bureau 12 obtains individual asset level information for the particular securities from a third-party provider 14. The credit bureau utilizes this information to match consumers associated with the asset level information and obtain additional information if needed from other data sources. In an embodiment involving underlying mortgage-related assets, the matching process involves the use of mortgage account numbers, origination loan amounts, mortgage origination dates, and geographic identifiers—such as, for example, zip code—to link mortgages from a securitized pool to individual consumers in the credit bureau database. For example, based on certain data, the credit bureau may obtain a credit report for the consumer. By matching individual loans to credit data and utilizing this loan-level credit data, a robust predictor can be determined through application of a statistical model. The statistical model is performed utilizing one or more portions of the data to output a vector of probabilities for the particular event modeled. This probabilities vector represents an inference about the credit risk of the underlying assets in the particular security, which can then be incorporated into pricing models, and utilized in the valuation of the security. The vector of probability is returned to the requestor to be used, for example, to discount the series of cash flows associated with each underlying asset, such as, for example, a mortgage.

According to a particular aspect, a method and system for pricing mortgage-related securities incorporates modeling and evaluation of time-dependent PD estimates for the underlying loans of the securities. By incorporating time-dependent models, a cumulative PD is provided for the loan over time and cash flows can be discounted according to different likelihoods of survival. The time-dependent models provide strong separation between good and bad loans.

The time dependent probability of default model is preferably based on a survival analysis model, such as, for example, the Cox Proportional Hazards Model. In the case of PD in connection with underlying loans of a mortgage-backed security, the probability of loan survival (non-foreclosure) up to time t is given by a non-parametric baseline survival function, which defines the observed survival probability at time t, given survival up to time t, and a parametric additive function that expresses survival time in terms of a series of parameterized covariates. In this case, the Cox Proportional Hazards Model may be expressed as:

$$S(t, X) = S_0(t)^{e^{\sum_{i=1}^{k} \beta_i x_i}}$$

where X is a row vector consisting of the covariates, β is a column vector consisting of regression parameters (unknown parameters) of the model, and m=number of covariates in the model.

Variables that may be used in modeling may include credit scores or credit attributes from one or more credit bureaus, mortgage loan information (term, loan amount, product type, etc.), mortgage payment history, LTV, AVM, macro economic historical data and forecasts, and aggregated credit bureau characteristics and forecasts. The credit bureau characteristics may include, for example, number of trades opened in past x months, age of oldest trade, months since most recent credit delinquency, number of credit inquiries in the past x months, presence of bankruptcy, number of collection trades, unpaid collection balances, or any other credit bureau characteristics that may influence risk prediction or have some significant correlation thereto. In a particular embodiment, trend data and macro-economic data are utilized. Trend data comprises aggregated consumer credit statistics, such as the data available through the Trend Data™ product offered by TransUnion®. Delinquency status characteristics that may be utilized include, for example, mortgage tradeline status at observation and over the performance period, aggregate mortgage status for up to 7 years prior to and including observation, various aggregate status (bankcard, mortgage, auto, etc.) for up to 7 years prior to and including observation, and various geographic aggregations, growth rates, and indices of various status over time. In a particular embodiment, one or more of the following characteristics are utilized in the modeling: 30 days past due, 60 days past due, 90 days past due, foreclosure, and 90 days past due plus foreclosure.

To create the model utilized in the case of a mortgage-backed security, certain data is obtained and utilized. First, a representative sample of data from a mortgage portfolio at a given point in time in the past (i.e., observation window) is utilized. Data such as loan information (e.g., APR, loan type, payment history, seasoning) and other available application data is utilized. Indicative information, such as name, address, and social security number, is utilized to match records to one or more credit bureau databases to obtain credit bureau characteristics, scores, and property value estimates. Alternatively, account information such as account number, loan amount, mortgage origination date, and geographic identifiers—such as, for example, zip code—could be used to match records from a mortgage portfolio to one or more credit bureau databases. Data relating to loan performance subsequent to the observation window is also utilized. Statistical software, such as SASS by SAS Institute, Inc., can be utilized in creation and processing of the model. The model definition involves the selection of predictors based on statistical significance measures as well as on the selection of relevant and stable model predictors.

The model can be validated by measuring the ability to rank foreclosures versus non-foreclosures by average predicted survival rate and by measuring the ability to rank early foreclosures versus later foreclosures by average predicted survival rate.

EXAMPLE

Subprime Model Case Study

A sample of subprime loans over two years old were obtained and monitored for performance for a period of 24 months. Initial data was extracted from a credit bureau database, selecting mortgages in good credit standing at the point of observation. The performance of the mortgages was followed for 24 months and the foreclosed mortgages were identified. A survival analysis model on the event of foreclosure was created and processed in accordance with the principles of the present invention to determine time dependent probability vectors for foreclosure. SAS® software by SAS Institute, Inc. was utilized to create/process the model utilizing the combination of loan data and a set of credit bureau statistics.

Figure 4:
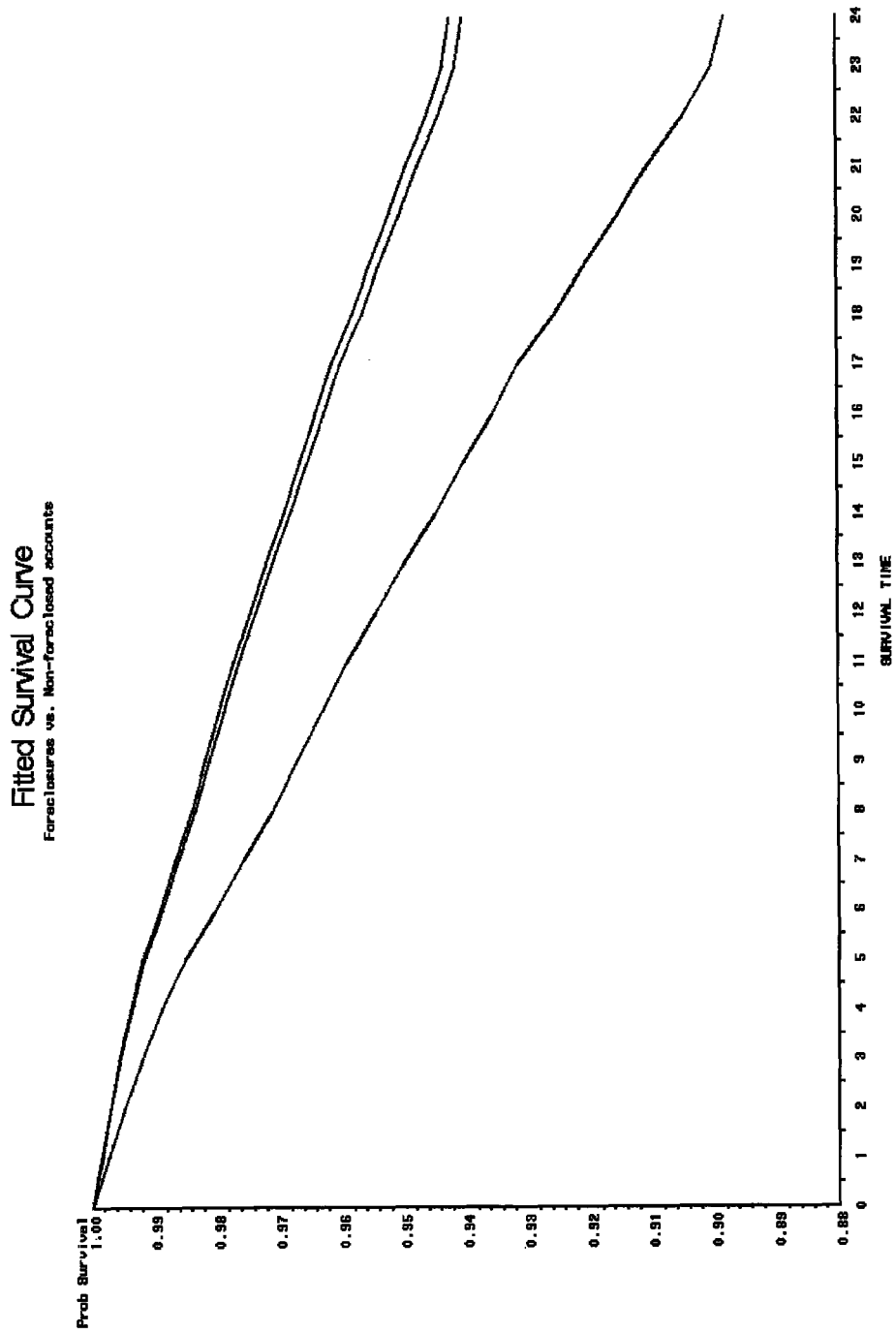
FIG. 4 is a graph of a fitted survival curve in terms of foreclosures vs. non-foreclosed accounts in connection with a case study performed in accordance with one or more principles contemplated herein.
Figure 5:
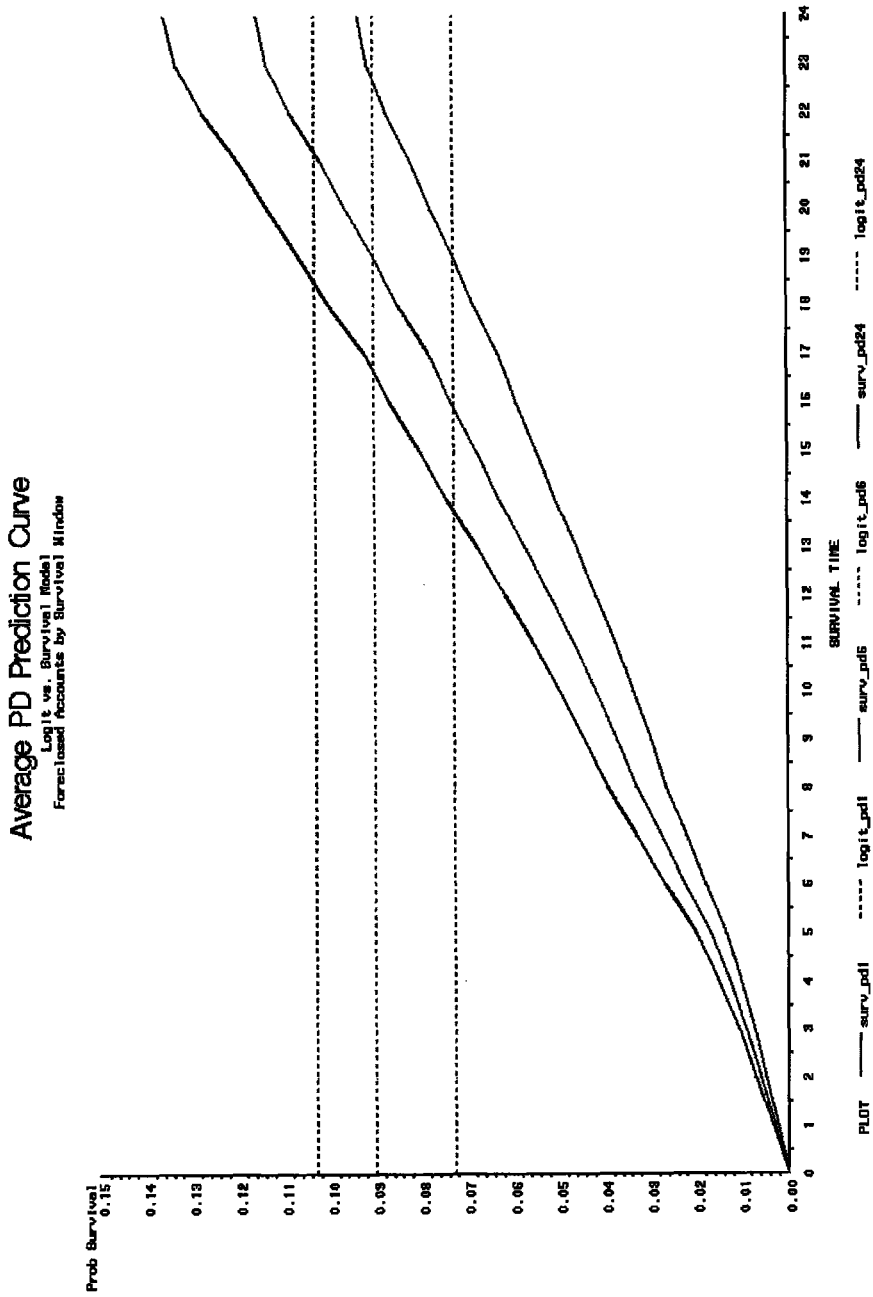
FIG. 5 is a graph of an average PD prediction curve in connection with a case study performed in accordance with one or more principles contemplated herein.

By applying the principles of the present invention and utilizing loan data coupled with credit bureau characteristics and analyzing them in a time-dependent, survival analysis model, a significant differentiation between well-performing and troubled subprime loans is uncovered. FIG. 4 shows a fitted survival curve in terms of foreclosures vs. non-foreclosed accounts, which illustrates this significant differentiation. FIG. 5 shows an average PD prediction curve. FIG. 5 also shows the flat PD prediction of static risk models to illustrate the more robust and accurate information obtained from the time-dependent survival model in accordance with the principles set forth herein. This comparison indicates that static models return higher NPV than a comparable time-sensitive model and that overstatement is higher with the static models for early defaults. Table 1 provides more detail of this comparison.

TABLE 1

| Default after: | Static model E(NPV) | Time-sensitive model E(NPV) | % Difference |
|---|---|---|---|
| 1 month | 320,531.19 | 311,969.30 | 2.67% |
| 6 months | 325,123.36 | 318,692.26 | 1.98% |
| 24 months | 331,311.56 | 326,134.30 | 1.56% |

Based on mortgages with $2,000 payments and 320 months

Figure 6:
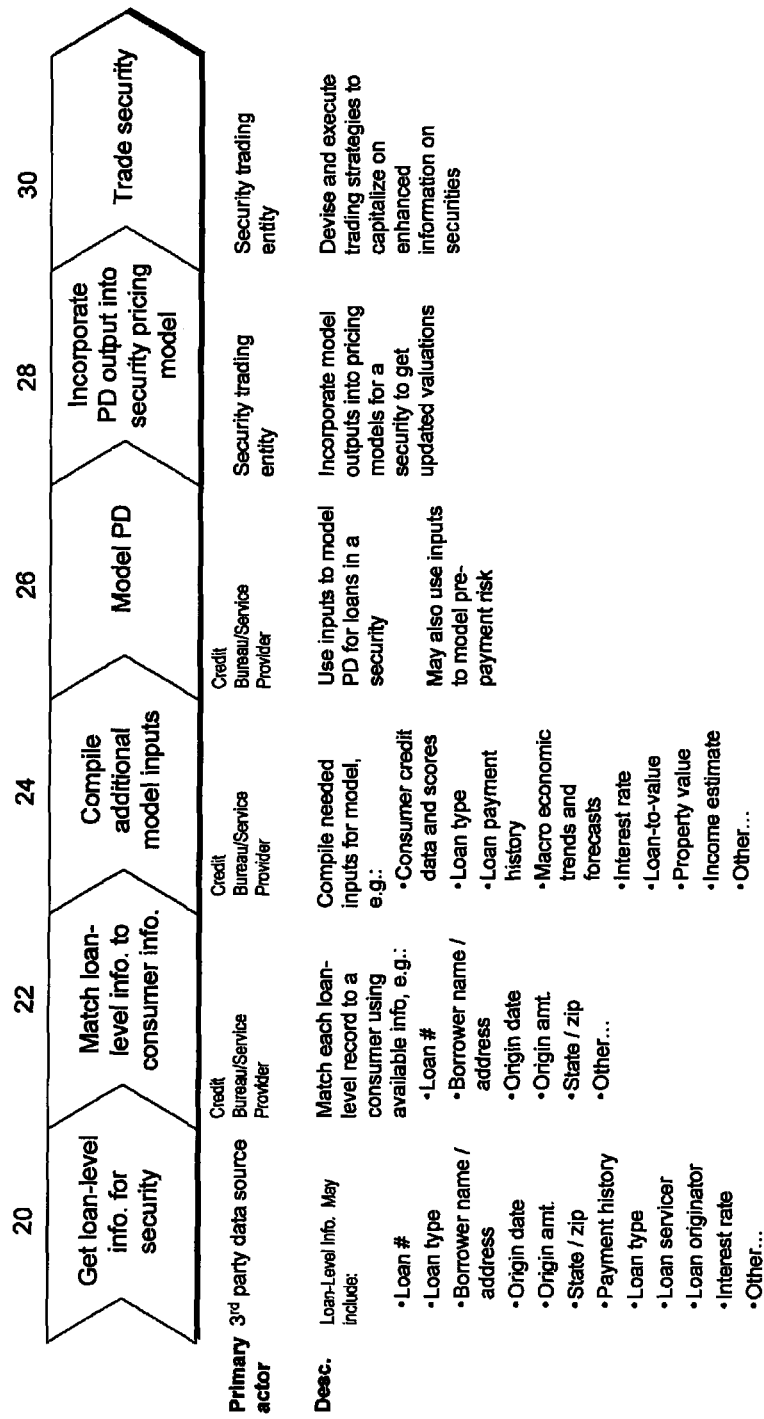
FIG. 6 is a process diagram generally outlining an embodiment of the system and method applying one or more principles of the present invention as applied to mortgage-backed securities.

In accordance with the principles of the present invention, a data process and method is contemplated to facilitate modeling of data for various securities. FIG. 6 is a method and process diagram generally outlining an embodiment of the system and method applying one or more principles of the present invention as applied to mortgage-backed securities. At step 20, loan level information is obtained for the particular security of interest. Such loan level information may be obtained from third-party data sources. Loan level information may include data such as loan number, loan type, borrower name, borrower address, origin date, origin amount, state, zip code, payment history, loan type, loan servicer, loan originator, interest rate, etc. At step 22, at least a portion of the loan level data is utilized to match each loan level record to a particular consumer within one or more databases by utilizing matching attributes. Once the consumer has been matched, additional data can be obtained, such as consumer credit data. At step 24, this additional data is compiled with the other loan level data for use with a model to predict an event, such as, probability of default (PD). In a preferred embodiment, macro economic trend and forecast data is compiled at step 24. At step 26, the compiled data is used in the model to generate an output. At step 28, the output is incorporated into pricing models for the particular security, which enables updated valuations. At step 30, trading strategies can be devised and executed utilizing the updated valuations and enhanced information on the particular security.

Figure 7:
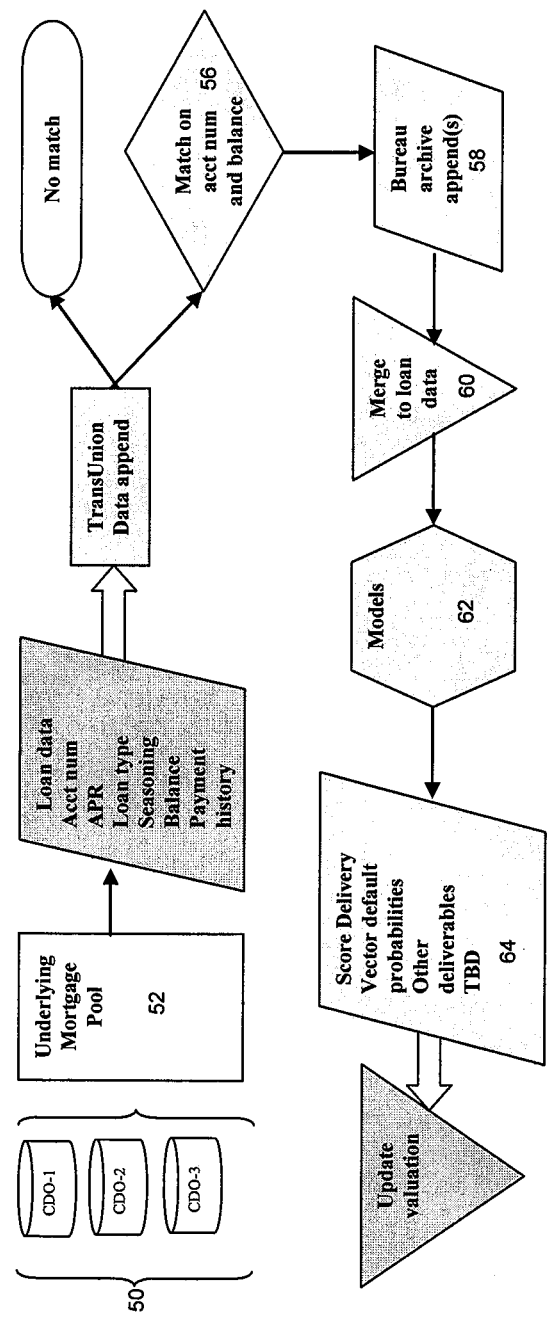
FIG. 7 is a flow chart outlining a method in accordance with the principles of the present invention as applied to risk prediction of a mortgage-backed security.

FIG. 7 is a flow chart outlining a method incorporating the model in accordance with one or more principles described herein as applied to risk prediction of a mortgage-backed security. As shown in FIG. 7, one or more databases 50 are accessed to obtain data relating to an underlying mortgage pool 52 of one or more mortgage-backed securities, such as, for example, loan data, account numbers, APR, loan type, mortgage seasoning, balance, payment history, or the like. A data append process is initiated at 54, wherein additional data, such as credit bureau data and related characteristics, is appended to the data obtained relating to the loan. A match process is performed to match records relating to the consumer of the underlying loan, or additional data relating to the loan, such as data relating to the property secured by the mortgage. In FIG. 7, a match process is performed at 56 utilizing matching attributes, such as account numbers and balances, to determine appendages at 58, such as credit bureau data and other data. At step 60, all additional data obtained is merged with the original loan data to create a data set suitable for the appropriate model processing at step 62. The data is processed in the model and an output is created and presented in a deliverable form at step 64. The deliverable form may include a score value, a vector probability, or the like. At step 66, valuation of the security is updated.

The systems, methods, and algorithms described herein are implemented via hardware, software, or a combination of software and hardware. The software comprises computer executable instructions stored on computer readable media in connection with the system within which it operates. For purposes of this specification, the term "computer readable media" should be construed as including all means on which data may be stored in any state and for any amount of time. Such means may include, for example, a hard disk drive, EEPROM, RAM, etc. Further, some algorithms, methods, and functions may be described in terms of modules, which may consist of software, hardware, firmware, or any combination thereof. Furthermore, a particular module may exist across more than one component. It should also be noted that multiple functions may be performed in one or more modules. The software is preferably executed on a digital signal processor, an application specific integrated circuit ("ASIC"), a microprocessor, or other type of processor or processing unit operating on a system, such as a personal computer, server, router, or other device capable of processing data, including network interconnection devices.

Figure 8:
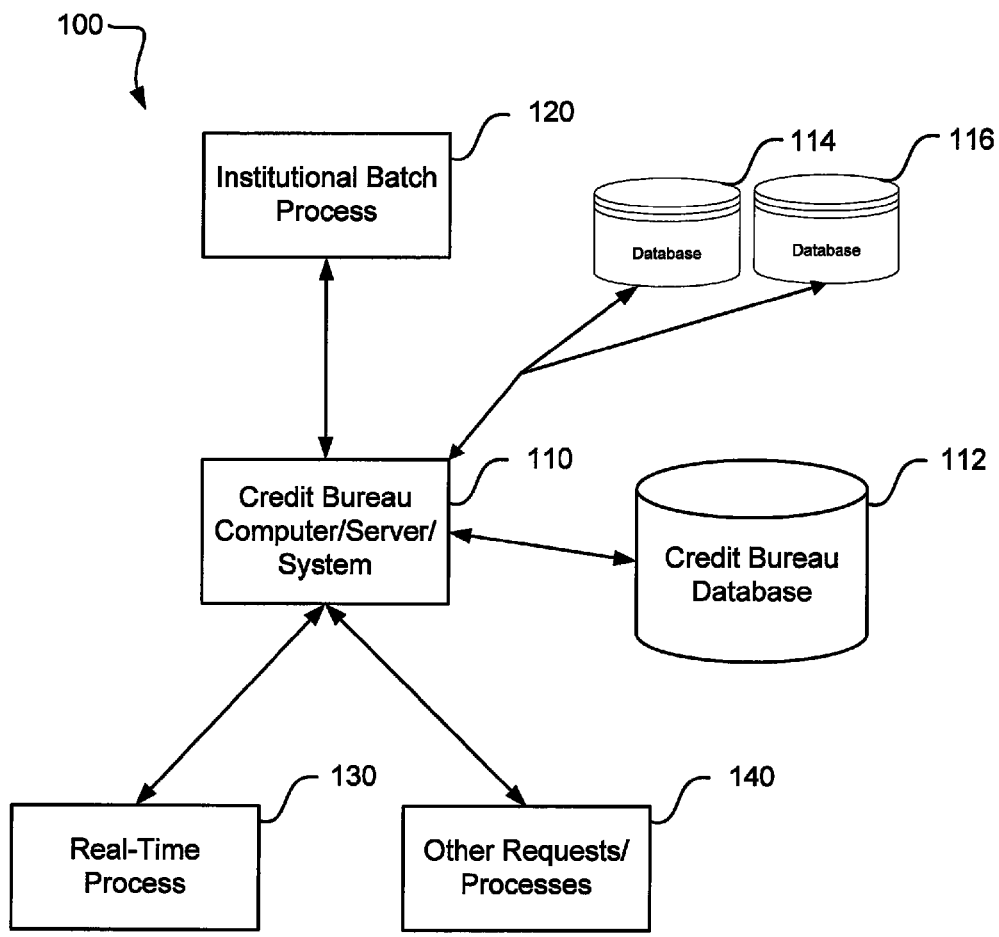
FIG. 8 is a schematic diagram of an additional embodiment of a system for carrying out methods in accordance with one or more principles contemplated herein.

Referring to FIG. 8, in a particular embodiment, the processes contemplated herein are implemented in a system 100, which includes a computer, server, or system 110 having at least one processor and one or more databases 112. In a particular embodiment, the computer 110 and the database 112 are associated with a particular credit reporting company or credit bureau. In an alternate embodiment, the computer 110 is also capable of communicating with one or more other databases 114, 116, which may be associated with third-party sources of data relating to loans/mortgages, additional credit reporting companies, or other sources of data in accordance with the principles contemplated herein. As illustrated in FIG. 8, data may be processed in connection with a batch process 120, where, for example, an entity or institution may desire to have its database of existing data, such as, for example, securities data, processed and updated to reflect the risk model analyses based on the statistics, characteristics, or methods contemplated herein. Other processes may include a real-time process 130, which may, for example, be associated with processing of a non-risk modeling request wherein the model may be run to update, verify, or determine for the first time the probability vector data and append this data in connection with the non-risk modeling request. Other requests or processes 140 can also access the computer 110. For example, an entity or institution may request a time-series set of credit file data, wherein the computer 110 retrieves from the database 112 credit data based on a request 140 for credit data relating to at least one of a plurality of credit characteristics. The computer 110 processes the data to create a time-series set of data for at least one of the plurality of credit characteristics. The computer 110 generates a transformed credit data set including the time-series set of data for at least one of the plurality of credit characteristics. The computer 110 then transmits the transformed credit data set to a second computer system, such as a system associated with the request 140, for analysis of the transformed credit data in connection with risk assessment associated with either current or proposed debt obligations. Such risk assessment may be conducted, for example, as part of pricing of a structured security or other collateralized debt product.

Figure 9:
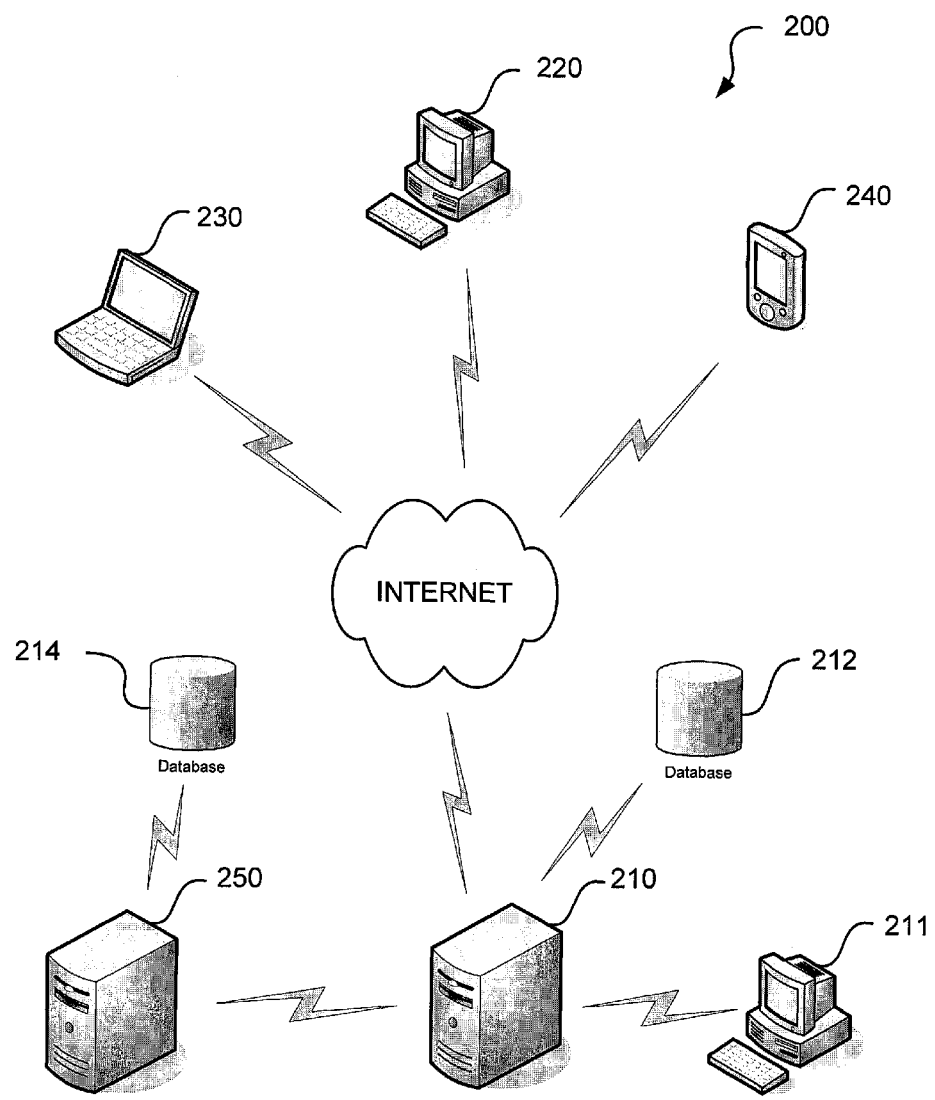
FIG. 9 is a schematic diagram of yet another embodiment of a system for carrying out methods in accordance with one or more principles contemplated herein.

In a particular implementation, a system 200 is provided, such as that shown in FIG. 9. In the system 200, the Internet provides a portal or gateway for communication with a server 210 to effectuate the statistic/characteristic processes or other processes contemplated and described herein. The server may include one or more other computers 211, such as those associated with a network in communication with the server 210. In a particular embodiment, the server 210 is in communication with credit database 212. The server 210 may also be in communication with one or more other servers 250, which may in turn be in communication with other databases 214. The processes contemplated herein may be interfaced through the Internet via any type of device capable of Internet communication, such as, for example, a laptop computer 230, a desktop computer or workstation 220, a handheld computing device 240, or the like.

Figure 10:
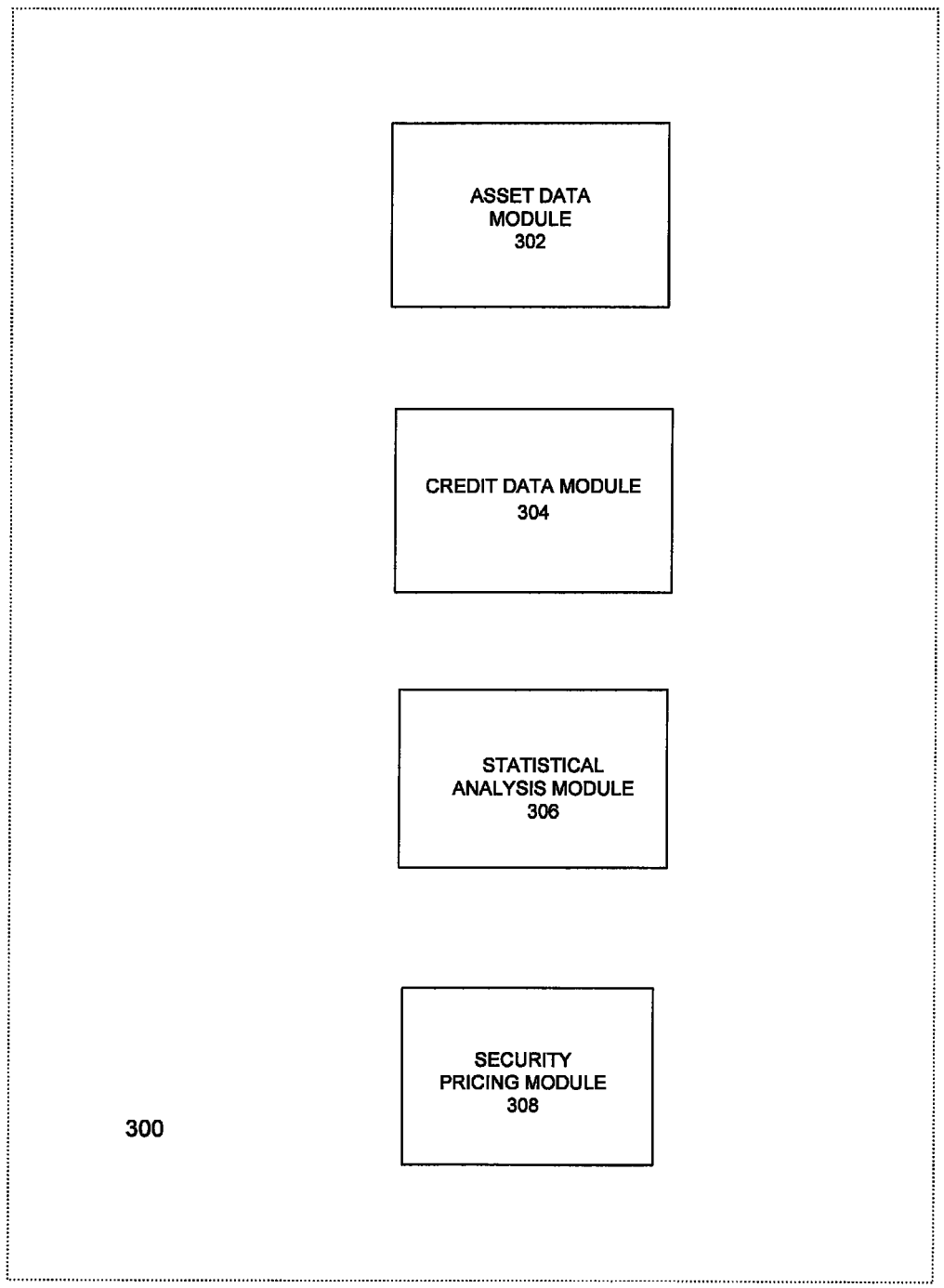
FIG. 10 is a schematic diagram illustrating an exemplary embodiment of a computer system for pricing a structured security with underlying assets.

In yet another embodiment, as shown in FIG. 10, a computer system 300 is provided for pricing a structured security with underlying assets. The system 300 includes an asset data module 302 configured to obtain asset data relating to the underlying assets of the security, a credit data module 304 configured to obtain credit-related data associated with the underlying assets of the security, a statistical analysis module 306 configured to accept at least a subset of the asset and credit-related data into a time-dependent survival analysis statistical model to calculate a vector of probability relating to the underlying assets, and a security pricing module 308 configured to utilize the vector of probability in pricing the security.

Figure 11:
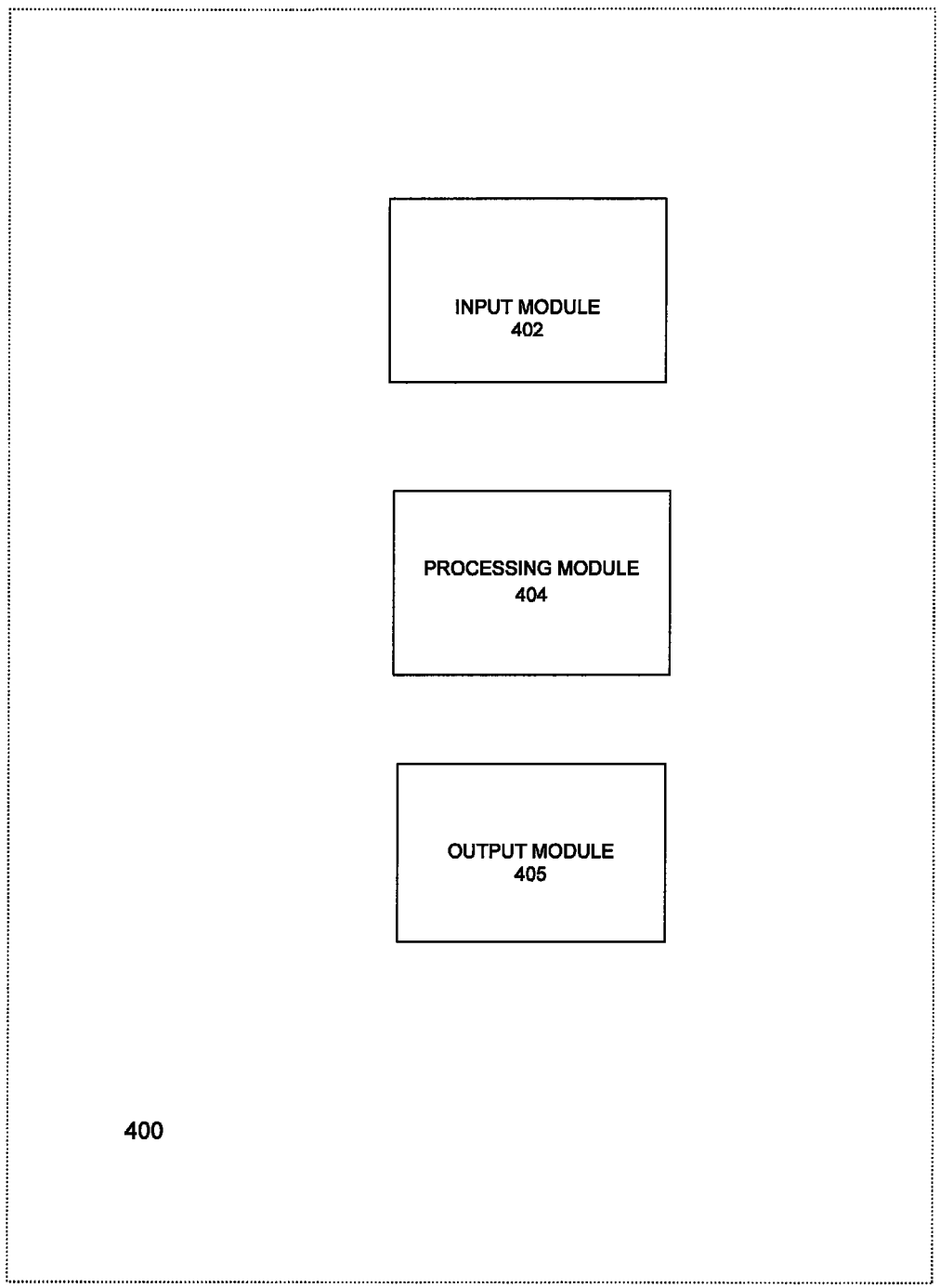
FIG. 11 is a schematic diagram illustrating an exemplary embodiment of a computer system for determining a vector of probability relating to underlying assets of a structured security.

In another embodiment, as shown in FIG. 11, a computer-based system 400 is provided for determining a vector of probability relating to underlying assets of a structured security. The system includes an input module 402 configured to (a) receive a request for risk prediction of the structured security from a requestor, (b) receive asset data relating to the underlying assets of the security, and (c) receive credit-related data associated with the underlying assets of the security. The system also includes a processing module 404 configured to (a) process at least a portion of the asset and credit-related data in a time-dependent survival analysis statistical model, (b) determine a vector of probability associated with the underlying assets, and (c) associate the vector of probability with the underlying assets. The system also includes an output module 406 configured to send an output to the requestor representing the risk associated with the underlying assets of the structured security.

While one or more specific embodiments have been illustrated and described in connection with the present invention, it is understood that the present invention should not be limited to any single embodiment, but rather construed in breadth and scope in accordance with recitation of the appended claims.

What is claimed is:

1. A computer system for matching underlying assets of a security to consumer credit data in connection with risk prediction associated with valuation and pricing of the security, the system comprising:
   a computer processor in selective communication with a requesting computer to receive an initial set of data associated with the security, the initial set of data comprising records of the underlying assets without sufficient consumer identification data for each consumer associated with each of the underlying assets;
   a computer readable medium accessible by the processor;
   a database in communication with the processor, the database containing a plurality of credit data files stored thereon, each of the plurality of credit data files associated with a respective consumer; and
   software stored on the computer readable medium for executing the steps of:
      identifying data in data fields of each of the records from the initial set of data that match data in data fields associated with the plurality of credit data files associated with the respective consumers, wherein at least one data field associated with the records from the initial set of data is matched to a differently named data field associated with the plurality of credit data files;
      for each of the matched data fields, assigning a weighted point score corresponding to a quality of the match;
      for each of the records from the initial set of data, determining an identity of a consumer associated with the plurality of credit data files that corresponds to a highest point score of the assigned point scores; and
      assigning the identity of the identified consumer to the respective record from the initial set of data;
      providing a prediction of an occurrence of an event relating to the underlying assets of the security based on the identity of the identified consumer and a time series credit score associated with the identified consumer's credit history over a predetermined period of time and at a predetermined time interval to permit an updated valuation and pricing of the security.

2. The system of claim 1, wherein the step of providing a prediction of an occurrence of an event comprises determining a vector of probability of the occurrence of the event over the predetermined period of time.

3. The system of claim 2, wherein the software stored on the computer readable medium executes the additional step of returning the vector of probabilities of the occurrence of the event to the requesting computer.

4. The system of claim 1, wherein if more than one consumer is identified with the same highest point score, the consumer with a most recent account activity in the respective credit data file is identified and assigned to the respective record.

5. The system of claim 1, wherein the data fields comprise a zip code for both the initial set of data and the plurality of credit data files, an origination amount for the initial set of data and a high credit amount for the plurality of credit data files, and an origination date for the initial set of data and an account open date for the plurality of credit data files.

6. The system of claim 1, wherein identifying the data in data fields comprises matching the data associated with a loan servicer name, an account number, and a primary zip code of each of the records from the initial set of data to corresponding data and data fields of the plurality of credit data files.

7. A computer system for pricing a security with underlying assets, the system comprising:
   a computer processor;
   a computer readable medium accessible by the processor; and
   software stored on the computer readable medium, the software comprising:
      an asset data module configured to obtain asset data relating to the underlying assets of the security, wherein the asset data is de-identified with respect to an identity of consumers associated with the underlying assets;
      a credit data module configured to obtain credit-related data of consumers associated with the underlying assets of the security;
      a statistical analysis module configured to generate a prediction of an occurrence of an event comprising a vector of probability of default over time for each of the underlying assets of the security, wherein the vector of probability of default comprises consumer credit histories of consumers associated with the underlying assets, wherein the consumer credit histories are obtained by matching the de-identified asset data to the credit-related data and
      a security pricing module configured to utilize the vector of probability over time in pricing the security.

8. The system of claim 7, wherein the credit-related data comprises macroeconomic trend data.

9. The system of claim 7, wherein the security is a mortgage-related security.

\* \* \* \* \*